US00RE41302E

(19) United States
(12) Reissued Patent
Drechsel

(10) Patent Number: US RE41,302 E
(45) Date of Reissued Patent: May 4, 2010

(54) SPRINKLER DIFFUSER DEVICE, ESPECIALLY FOR PLANTS FOR THE SPRAY DISTRIBUTION OF WATER AND OTHER SIMILAR LIQUIDS

(76) Inventor: Arno Drechsel, Marcherstrasse, 5A, Lienz (AT), 9900

(21) Appl. No.: 11/232,412

(22) Filed: Sep. 21, 2005

Related U.S. Patent Documents

Reissue of:
(64) Patent No.: 6,811,098
Issued: Nov. 2, 2004
Appl. No.: 10/365,307
Filed: Feb. 12, 2003

(30) Foreign Application Priority Data

Dec. 2, 2002 (IT) ..... VI2002A0265

(51) Int. Cl.
*B05B 1/26* (2006.01)
*B05B 3/02* (2006.01)

(52) U.S. Cl. ..... 239/498; 239/391; 239/505; 239/507; 239/222.11; 239/600; 285/921

(58) Field of Classification Search ..... 239/498, 239/391, 505, 507, 600, 222.11, 436, 461, 239/499, 518, 512–515, DIG. 1; 285/921; 169/37
See application file for complete search history.

(56) References Cited

U.S. PATENT DOCUMENTS 3,785,572 A * 1/1974 Arnold et al. ..... 239/518
5,224,653 A 7/1993 Nelson et al.
5,226,599 A 7/1993 Lindermeir
5,271,561 A 12/1993 Tobias
5,372,307 A 12/1994 Sesser
5,415,348 A 5/1995 Nelson
5,439,174 A 8/1995 Sweet
5,456,411 A 10/1995 Scott
5,588,595 A 12/1996 Sweet et al.
5,671,885 A 9/1997 Davisson
5,762,269 A 6/1998 Sweet
5,971,297 A 10/1999 Sesser
6,382,525 B1 5/2002 Santiesteban et al.

FOREIGN PATENT DOCUMENTS

EP 0709140 1/1993

* cited by examiner

*Primary Examiner*—Darren W Gorman
(74) *Attorney, Agent, or Firm*—R Neil Sudol; Henry D Coleman; William J Sapone

(57) ABSTRACT

A sprinkler device[, especially for units] for [the spray distribution of] *dispersing* water [and other similar liquids, comprising an at least partly hollow central body defining a longitudinal axis, a connecting sleeve to a supply line removably secured to the central body, a convergent] *to plants includes a deflector member disposed downstream from a* nozzle [to accelerate the liquid located between the central body and the sleeve, a diverter unit located downstream from the nozzle to] *for* divert*ing* [the flow] *a stream of fluid from the nozzle* in a substantially transverse direction [so as] to [spray] *disperse* the fluid outwards[, first snap means to connect the nozzle to the sleeve]. [The first snap connection means are arranged so as to hold the nozzle in an axially immobilised position with respect to the sleeve when the latter is fitted to and disconnected from the central body.] *The deflector member is substantially in the form of a plate having a shaped surface facing an outlet of the nozzle and disposed at a predetermined axial distance therefrom, to divert a substantially axial flow of the fluid issuing from the nozzle along a plurality of transverse directions.*

17 Claims, 5 Drawing Sheets

SPRINKLER DIFFUSER DEVICE, ESPECIALLY FOR PLANTS FOR THE SPRAY DISTRIBUTION OF WATER AND OTHER SIMILAR LIQUIDS

Matter enclosed in heavy brackets [ ] appears in the original patent but forms no part of this reissue specification; matter printed in italics indicates the additions made by reissue.

FIELD OF APPLICATION

This invention is generally applicable in the filed of irrigation plants and units for the distribution of liquid products, and particularly relates to a sprinkler device for water and other similar liquids.

The device may advantageously be used in agriculture, but it may also be used in other industrial fields, for example in the mining industry, to knock down dusts and to cool materials which are likely to self-ignite.

STATE OF THE ART

Numerous sprinkler devices of the type for irrigation are known.

U.S. Pat. No. 5,415,348 describes a sprinkler assembly comprising a central hollow body defining a longitudinal direction which is provided with an inlet portion and an outlet portion. A connecting sleeve to a water supply line is also provided, and onto this can be screwed the inlet portion of the central body. Within the sleeve and the central body there is located a convergent nozzle, which is of one piece with a closed ring which can be seen from the exterior and this is designed to accelerate the water to a diverter unit connected to the central body. The convergent nozzle has an annular flange close to its discharge which extends radially outward, from which a plurality of elongated elements which are designed to support the closed ring extend in a longitudinal direction. During assembly the connecting sleeve is slidably inserted into the closed ring so as to abut against a sealing O-ring positioned on the annular flange.

One main disadvantage of this arrangement lies in the need to use an O-ring to ensure a seal between the convergent nozzle and the connecting sleeve. This feature complicates construction of the device, with a consequent deterioration in overall costs, and forces the user to periodically check the state of wear of the O-ring and, if necessary, to replace it.

The need to replace the convergent nozzle by another having a different cross-section to adjust the quantity of water to different irrigation requirements frequently arises. In this case the sleeve remains connected to the water feed line while the central body is disconnected. In particular, when the central body is disconnected the sleeve slides with respect of the nozzle, which remains in its seat within the central body. Thus in order to remove the nozzle it is first necessary to remove the central body and then through an additional operation to slide the nozzle off the central body, and it is not possible to remove the sleeve and the nozzle from the central body together in a single operation.

In this arrangement the diverter unit is removably attached to the central body and can be replaced by applying a force manually to it in the direction of the longitudinal axis and a simultaneous rotation force so as to release it from appropriate snap means. This operation may require considerable force because of the hardness and rigidity of the snap means, and may therefore give rise to consequent tiring of the operator, especially if the number of diverter units which have to be replaced is high, as is frequently the case.

In addition to this the diverter unit comprises a plate on which a shaped surface and, conveniently, a second shaped surface on the opposite side is mounted. One disadvantage of this arrangement lies in the complexity of having to construct three separate parts and then having to assemble them, with a consequent increase in manufacturing costs. In addition to this the two shaped surfaces are difficult to remove from the plate. This feature, together with the fact that it is not possible to fit more than two shaped surfaces, substantially reduces the possibilities of adjusting the device to different applications.

DESCRIPTION OF THE INVENTION

A primary object of this invention is to eliminate the abovementioned disadvantages providing a sprinkler device which is reliable and which is capable of maintaining its properties unchanged over time without requiring particularly onerous maintenance.

A particular object is to provide a sprinkler device which can be easily adapted to different requirements and applications.

A further object of the invention is to provide a sprinkler device whose components can be rapidly and conveniently replaced without requiring the application of a strong force.

Another particular object is to provide a sprinkler device which is economically advantageous, in order to reduce costs for both the manufacturer and the final user.

These objects, as well as others which will be more apparent below, are achieved in accordance with claim 1 by a sprinkler device particularly for spray distribution units for water and other similar liquids comprising an at least hollow central body defining a longitudinal axis, a connecting sleeve to a feed line which is removably attached to the central body, a convergent nozzle to accelerate the liquid located between the central body and the sleeve, a diverter unit located downstream from the nozzle to divert the flow in a substantially transverse direction so as to spray the fluid outwards, characterised in that it comprises first snap connection means between the nozzle and the sleeve. The first snap connection means are designed to hold the nozzle in an axially immobilised position with respect to the sleeve when fitting the latter to and removing it from the central body. Through this configuration it is possible to remove the nozzle from the central body together with the sleeve in a single simple operation instead of two separate operations, and use of the most appropriate nozzle for any particular application is therefore made easy.

Preferably a supporting member extends from the central body to removably anchor the diverter unit and is provided with guide means to permit the diverter unit to be selectively inserted and axially immobilised by sliding along a substantially transverse plane.

Through this feature a sprinkler device can be easily adapted to different requirements and uses and in particular the diverter unit can be quickly and conveniently replaced without requiring the application of a great force.

Advantageously the diverter unit is substantially plate-shaped with a first shaped surface facing the outlet cross-section of the nozzle and a second shaped surface opposite the first. Through this feature the diverter unit with the two shaped surfaces forms a single piece and can be constructed through a single moulding operation with a consequent saving in comparison with the construction of three separate parts.

BRIEF DESCRIPTION OF THE DRAWINGS

Further features and advantages of the invention will be more apparent from the detailed description of some preferred but non-exclusive embodiments of a sprinkler device according to the invention illustrated by way of a non-limiting example through the appended tables of drawings in which.

DETAILED DESCRIPTION OF A PREFERRED EMBODIMENT

Figure 1:
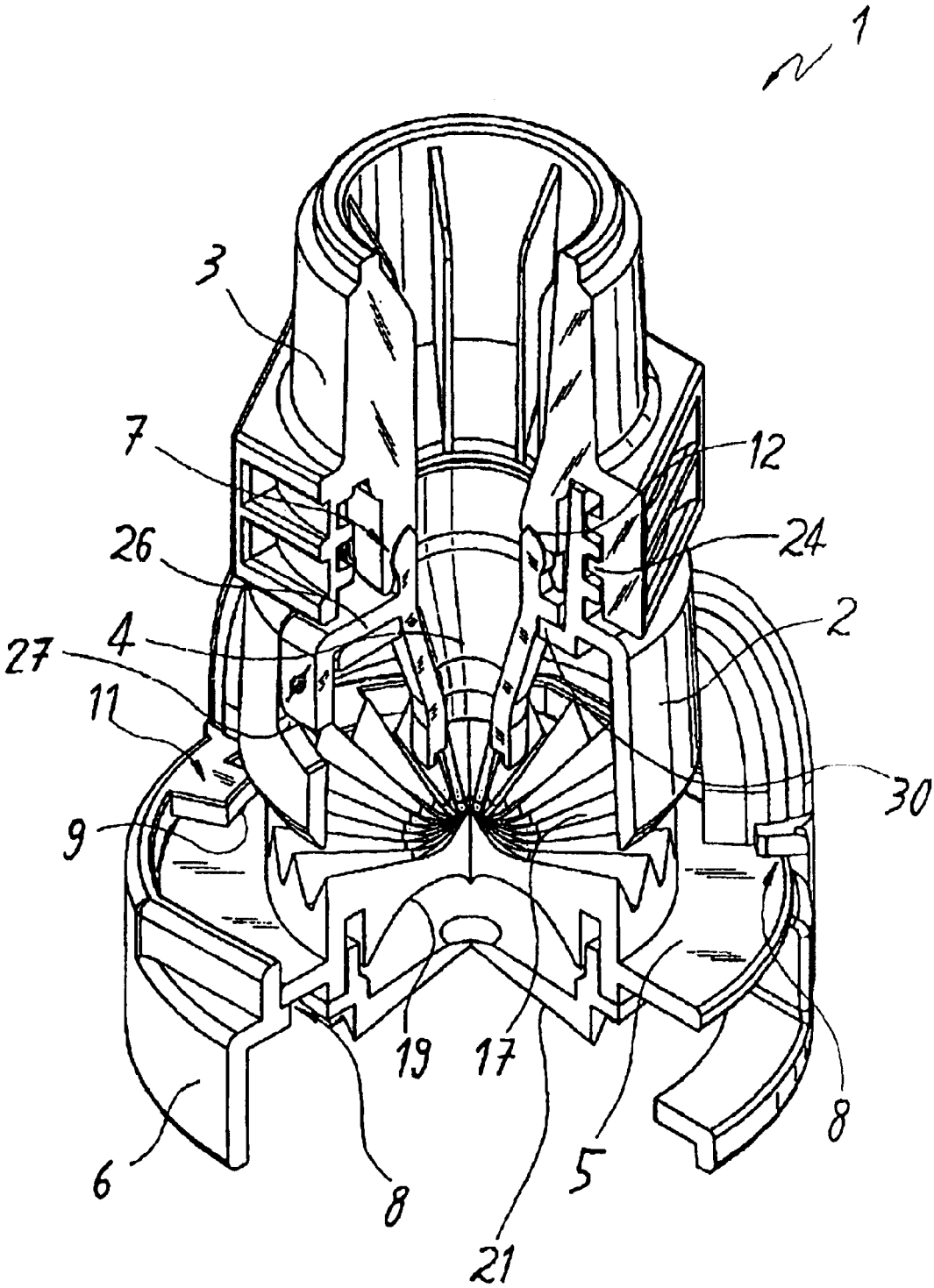
FIG. 1 shows a perspective view of a sprinkler device according to the invention in partial cross-section.
Figure 2:
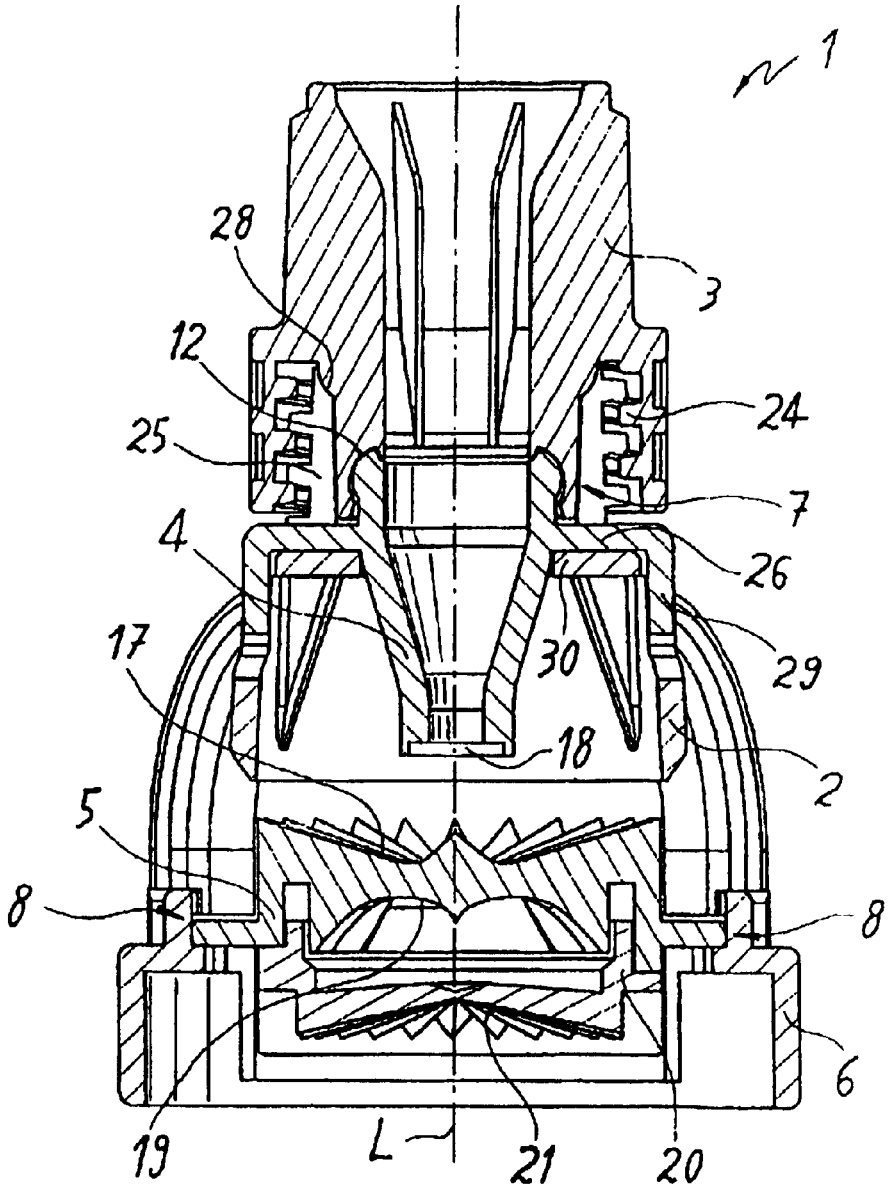
FIG. 2 shows a side view of the device in FIG. 1 in cross-section.
Figure 3:
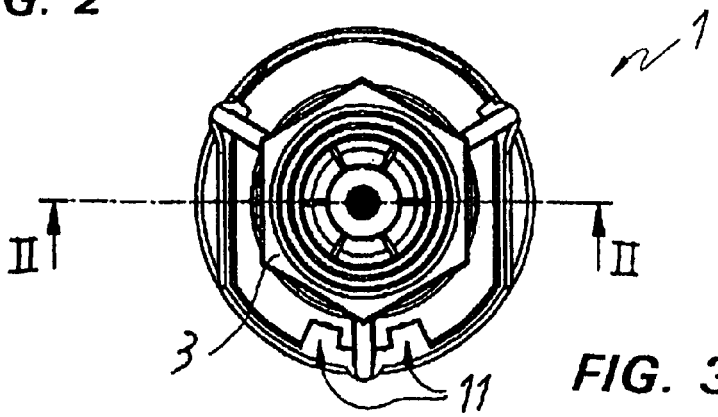
FIG. 3 shows a view of the device in FIG. 1 from above.
Figure 4:
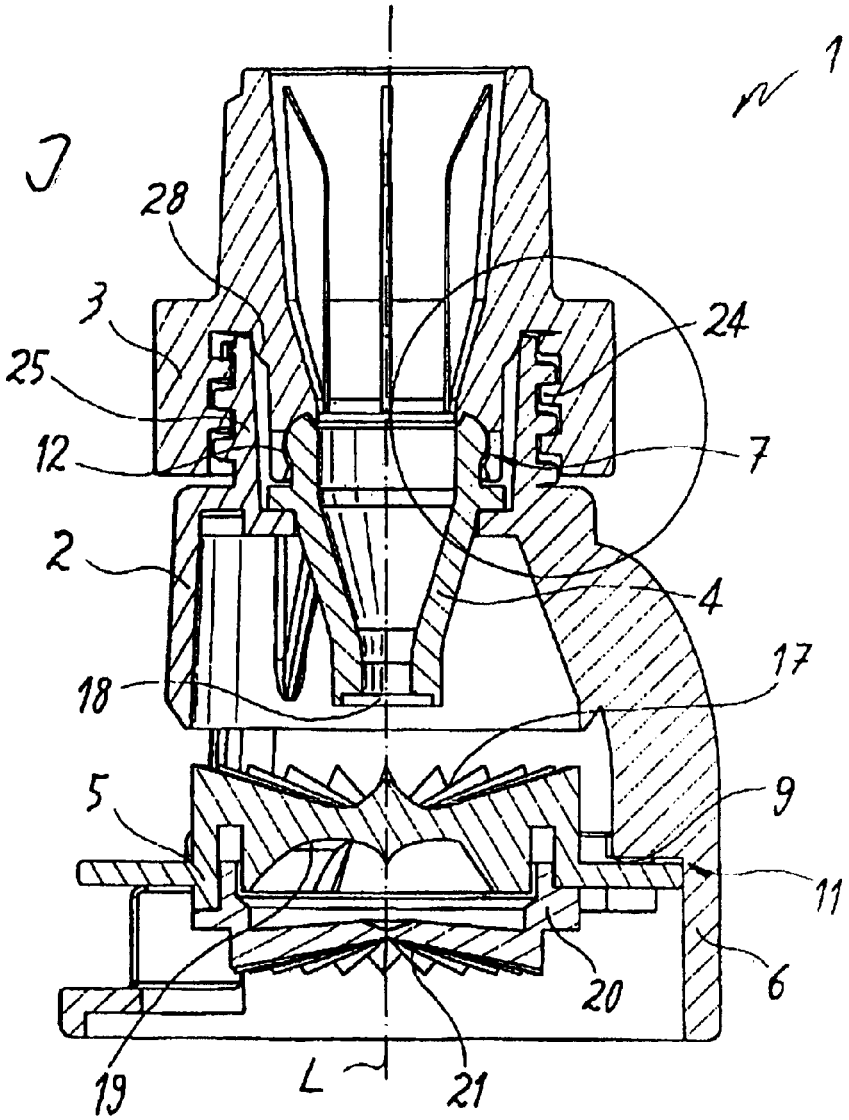
FIG. 4 shows a second side view of the device in FIG. 1 in cross-section.
Figure 5:
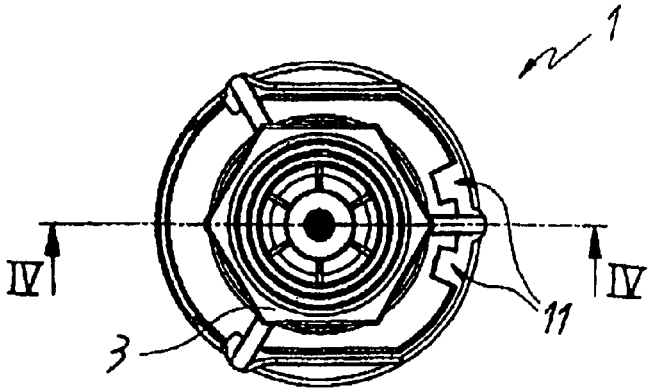
FIG. 5 shows a second view of the device in FIG. 1 from above.
Figure 6:
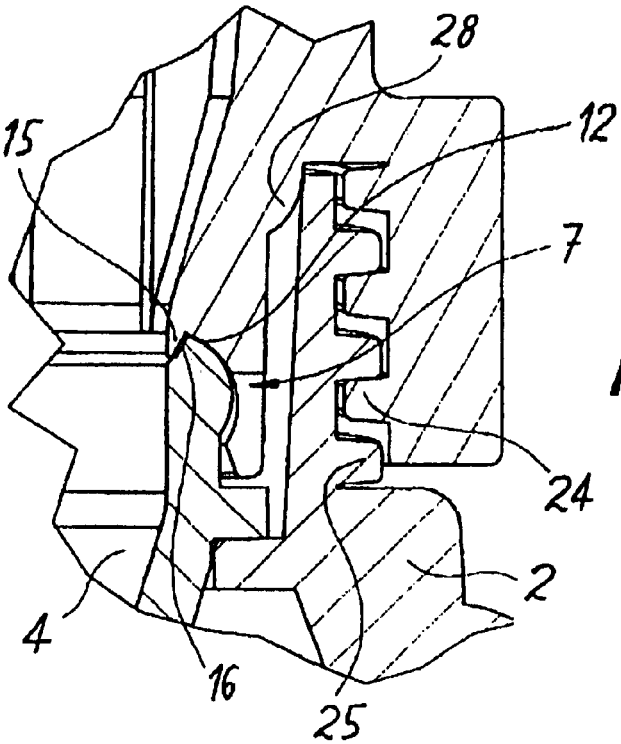
FIG. 6 shows a partly magnified view of the device in FIG. 4.
Figure 7:
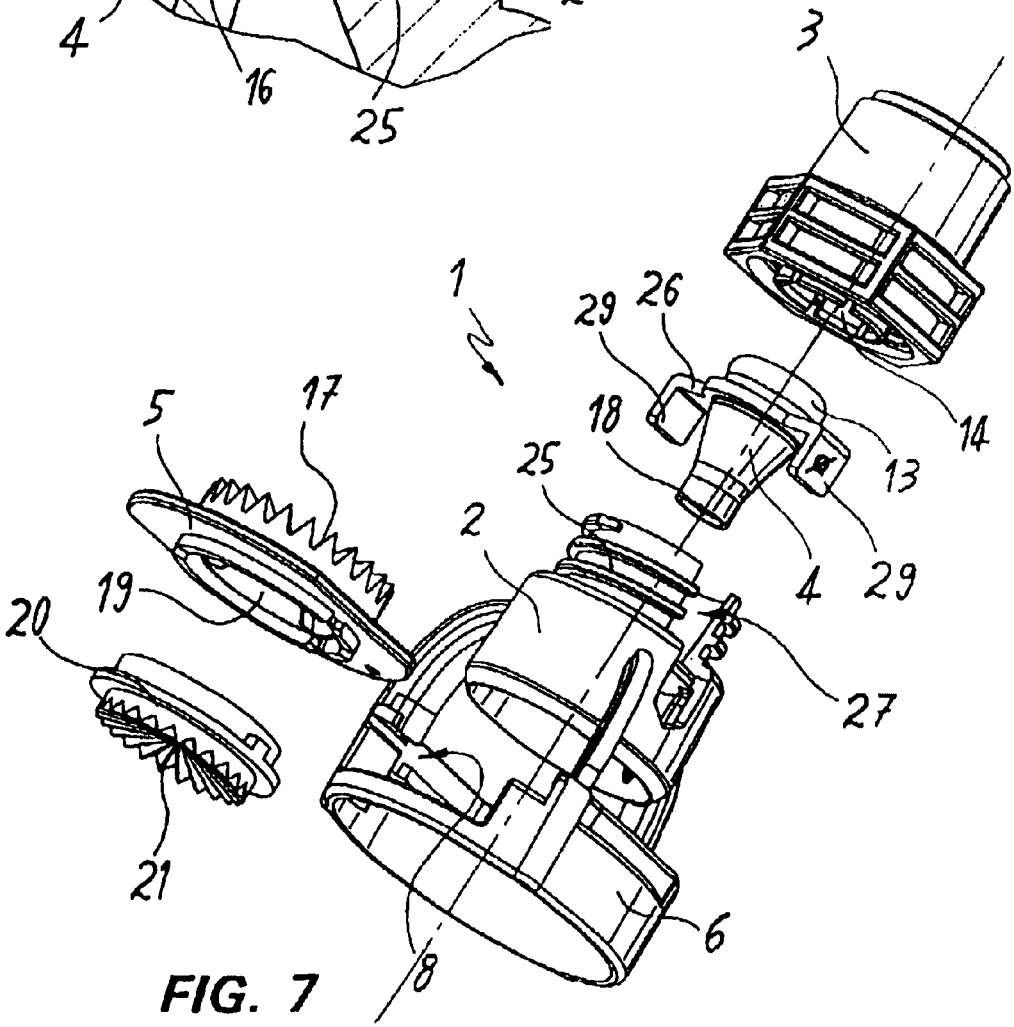
FIG. 7 shows an exploded view of the device in FIG. 1.
Figure 8:
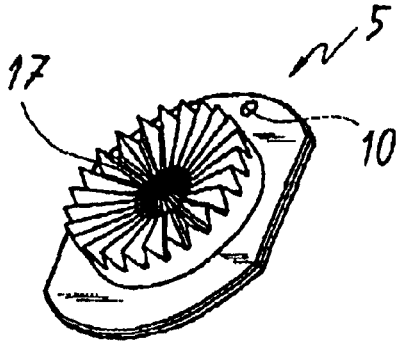
FIG. 8 shows a perspective view of a detail of FIG. 7.
Figure 9:
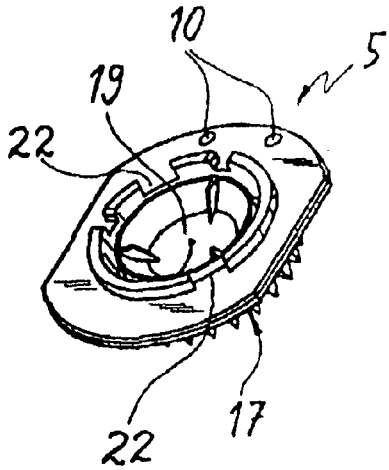
FIG. 9 shows a second perspective view of the detail in FIG. 8.
Figure 10:
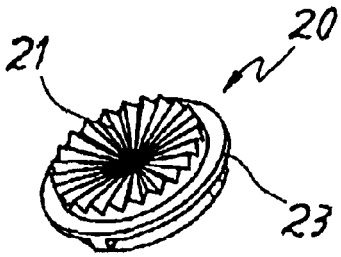
FIG. 10 shows a perspective view of a second detail in FIG. 7.
Figure 11:
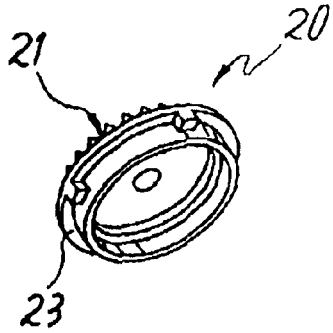
FIG. 11 shows a second perspective view of the detail in FIG. 10.
Figure 12:
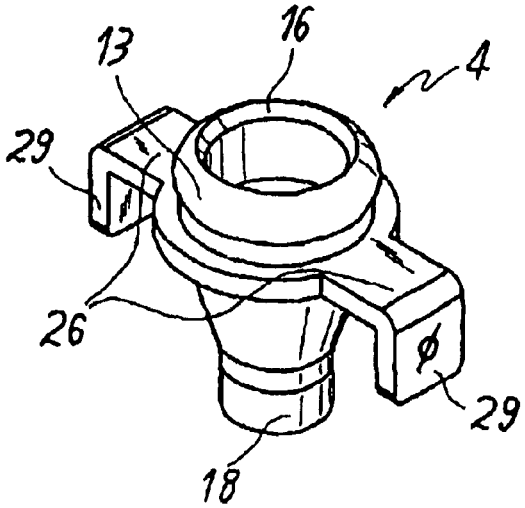
FIG. 12 shows a perspective view of a third detail in FIG. 7.
Figure 13:
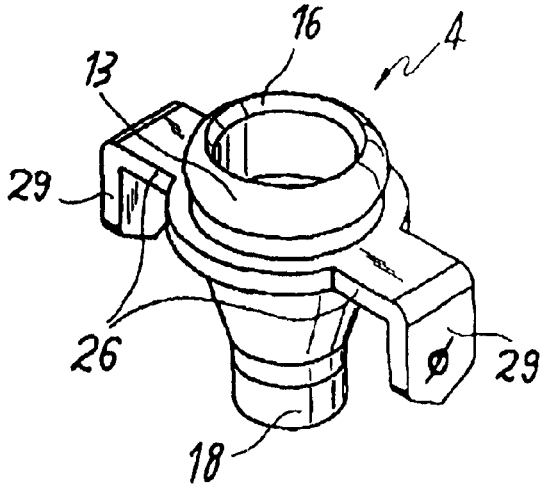
FIG. 13 shows a perspective view of a second embodiment of the detail in FIG. 12.

A sprinkler device according to the invention, indicated as a whole by reference number 1, particularly for spray distribution units for water and other similar liquids, is described with particular reference to the figures cited.

Sprinkler device 1 comprises an at least partly hollow central body 2, to which there is removably attached a connection sleeve 3 to a feed line (not shown in the drawings). Central body 2 is substantially cylindrical and defines a longitudinal axis L. Between central body 2 and sleeve 3 there is located a convergent nozzle 4 to accelerate the liquid towards a substantially plate-shaped diverter unit *or deflector member* 5.

Diverter unit *or deflector member* 5 is removably attached to a supporting member 6 in a position downstream from nozzle 4 to divert the flow in a substantially transverse direction and spray the fluid outwards. In particular supporting member 6 extends from central body 2 and may be of one piece with the latter.

In accordance with the invention sprinkler device 1 comprises first means 7 for snap connection between nozzle 4 and sleeve 3. Nozzle 4, when fitted to and disconnected from central body 2 is held in an axially immobilised position with respect to sleeve 3 by first snap connection means 7.

In this way, when it is desired to replace nozzle 4 of a sprinkler device 1 it is sufficient to remove central body 2 in a single operation from the assembly comprising nozzle 4 and sleeve 3, which remains connected to the liquid feed line, releasing nozzle 4 from first snap connection means 7, placing the new nozzle 43 in its stead and fitting central body 2 to the new assembly of nozzle 4 and sleeve 3.

Diverter unit 5 may be selectively inserted into supporting member 6 through suitable guide means 8 which allow diverter unit 5 to slide along a plane which is substantially transverse to longitudinal axis L while preventing any possibility of axial displacement of the same.

Suitably supporting member 6 comprises at least one projection 9 which can be selectively snap engaged onto at least one corresponding recess or cavity 10 provided in diverter unit 5. Projection 9 and corresponding cavity 10 also make it possible to selectively immobilise diverter unit 5 in a direction transverse to longitudinal axis L and as a whole define second snap connection means 11.

More particularly, first snap connection means 7 comprise a spherical joint 12 formed by a rounded portion 13 projecting in the axial direction of nozzle 4, which can be snap connected to a matching surface 14 provided in sleeve 3.

Spherical joint 12 allows nozzle 4 to rotate freely about longitudinal axis L with respect to sleeve 3 and to be inclined at a predetermined angle to the said axis.

In order to avoid undesired leakage of liquid into the connection zone between nozzle 4 and sleeve 3 the latter comprises a substantially frustoconical portion 15 which is coaxial with longitudinal axis L and is capable of forming a seal against a substantially frustoconical surface 16 of nozzle 4. In particular substantially frustoconical portion 15 of sleeve 3 and substantially frustoconical surface 16 of nozzle 4 may have substantially identical corresponding taper angles to ensure maximum adhesion and seal between them.

As already mentioned, the function of diverter unit *or deflector member* 5 is to divert the substantially axial flow of liquid originating from nozzle 4 along a plurality of substantially transverse directions. This operating feature is achieved by constructing a first shaped surface 17 on diverter unit 5 facing the outlet cross-section 18 of nozzle 4 positioned at a predetermined axial distance from the said outlet cross-section 18.

Appropriately the axial dimensions of diverter unit 5 are such as to permit it to be inserted into guide means 8 with first shaped surface 17 facing the outlet cross-section 18 of nozzle 4 or in a position substantially rotated through 180°. In addition to this, a second shaped surface 19 opposite the first may be provided on diverter unit 5. When diverter unit 5 is inserted into the position rotated through 180° the second shaped surface 19 also brings about deviation of the substantially axial flow of liquid leaving nozzle 4 along a plurality of transverse directions. As a result of this feature the user can replace first shaped surface 17 with second surface 19 merely by sliding diverter unit 5 along guide means 8, rotating it through 180°, and again inserting it into supporting member 6.

The possibilities for diverting the flow of liquid can be further enlarged by the fact that diverter unit 5 may also comprise a removable insert 20 which can be fitted above second shaped surface 19 defining a third shaped surface 21. Suitably shaped surfaces 17, 19, 21, or only some of these, have a plurality of radial grooves to form a plurality of separate jets of liquid. The radial grooves may cover the entire rotational angle or only a fraction of the latter.

The flow, when deviated from the axial direction to the transverse directions, exerts a substantially vertical thrust on shaped surface 17, 19, 21 which diverts the flow, as can be checked by applying the theorem of the momentum of a fluid under steady state conditions.

If the flow is directed onto third shaped surface 21, the vertical thrust of the fluid compresses removable insert 20 between diverter unit 5 and helps to make the connection between the latter stable. In this way it prevents removable insert 20 from becoming displaced or detached when it is in operation, but at the same time it may make it difficult to remove by hand from diverter unit 5.

To resolve this problem diverter unit 5 has one or more recesses 22 in the outer edge 23 of removable insert 20 to assist removal of the latter by inserting the tip of a screwdriver or similar tool.

Conveniently the connection between sleeve 3 and central body 2 may be made using a threaded connection, in particular through a thread 24 on sleeve 3 which can be screwed onto a corresponding threaded portion 25 of central body 2.

In addition, to prevent the rotation of nozzle 4 with respect to central body 2 when they are screwed together, nozzle 4 may have one or more radial appendages 26 which project outwards and can be slidably inserted into corresponding openings 27 in central body 2. Openings 27 in central body 2 also extend into the threaded portion 25 of the same. Thus to hold threaded portion 25 in the correct position and support it radially sleeve 3 has a suitably dimensioned annular portion 28 at the inner longitudinal end of thread 24.

Advantageously, each radial appendage 26 has at least one end portion 29 which can be seen from the exterior and is substantially flat, onto which a mark or inscription may be placed to identify the type and/or size of nozzle 4 even when device 1 is fully assembled.

Central body 2 may also comprise an annular bracket 30 directed radially inwards and designed to align nozzle 4 with respect to diverter unit 5.

From what has been described above it is obvious that the sprinkler device according to the invention achieves the specified objects and in particular the first and second snap connection means together with the action of the guide means of the supporting member make the operations of changing the nozzle and the diverter unit extremely convenient and quick. In addition to this the possibility of having three different shaped surfaces on a single diverter unit and that of replacing the diverter unit with another of a different type make the sprinkler device extremely versatile and easily adaptable to many different applications.

Many modifications and variants, all of which fall within the scope of the invention expressed in the appended claims, may be made to the device according to the invention. All details may be replaced by other technically equivalent elements and materials may differ according to requirements without going beyond the scope of the invention.

Even though the device has been described with particular reference to the appended figures, the reference numbers used in the description and in the claims are used for a better understanding of the invention and do not constitute any restriction upon the scope of protection claimed.

What is claimed is:

1. A sprinkler device, particularly for [spray distribution plants for] *dispersing* water and other similar liquids *to plants*, comprising [an at least partly hollow] *a* central body [defining] *which is at least partially hollow and defines* a longitudinal axis, a [connecting] *connection* sleeve *for connecting* to a feed line [which is], *said sleeve being* removably [attached] *linked* to [the] said central body, a convergent nozzle [to accelerate] *for accelerating* the liquid [located] *interposed* between [the] said central body and [the] said sleeve, *and* a [diverter unit located] *deflector member disposed* downstream from [the] said nozzle [to divert the flow] *for diverting a stream of fluid from said nozzle* in a substantially transverse direction [so as] to [spray] *disperse* the fluid outwards, [and first snap connection means between the said nozzle and the said sleeve, the said first snap connection means being designed to hold the said nozzle in an axially immobilised position with respect to the said sleeve when the latter is fitted onto and removed from the said central body] *wherein said deflector member is substantially in the form of a plate having a shaped surface facing an outlet of said nozzle and disposed at a predetermined axial distance therefrom, to divert a substantially axial flow of the fluid issuing from said nozzle along a plurality of substantially transverse directions, wherein a supporting member extends from said central body to removably anchor said deflector member, said supporting member having guide means to permit selective insertion of said deflector member, said guide means being configured to permit selective insertion and axial immobilization of said deflector member through sliding along a substantially transverse plane*.

[2. Device according to claim 1, wherein a supporting member extends from the said central body to removably anchor the said diverter unit, the said supporting member having guide means to permit selective insertion and axial immobilisation of the said diverter unit through sliding along a substantially transverse plane.]

3. Device according to claim [2] *1*, wherein [the] said supporting member comprises at least one projection defining [second] snap connection means which can be selectively snap engaged on at least one corresponding recess or cavity provided in [the] said [diverter unit] *deflector member* in order to [immobilise it] *immobilize said deflector member* transversely.

4. Device according to claim [1] *20*, wherein [the] said [first] snap connection means comprise a spherical joint to permit [the] said nozzle to be inclined at a predetermined angle with respect to [the] said longitudinal axis and axial rotation of [the same] *said nozzle* with respect to [the] said sleeve.

5. Device according to claim 4, wherein [the] said spherical joint comprises a rounded portion projecting in an axial direction from [the] said nozzle which can be snap connected to a matching surface provided on [the] said sleeve.

6. [Device according to claim 1] *A sprinkler device, particularly for dispersing water and other similar liquids to plants, comprising a central body which is at least partially hollow and defines a longitudinal axis, a connection sleeve for connecting to a feed line, said sleeve being removably linked to said central body, a convergent nozzle for accelerating the liquid interposed between said central body and said sleeve, and a deflector member disposed downstream from said nozzle for diverting a stream of fluid from said nozzle in a substantially transverse direction to disperse the fluid outwards, wherein said deflector member is substantially in the form of a plate having a shaped surface facing an outlet of said nozzle and disposed at a predetermined axial distance therefrom, to divert a substantially axial flow of the fluid issuing from said nozzle along a plurality of substantially transverse directions*, wherein [the] said sleeve comprises a substantially frustoconical portion which is coaxial with [the] said longitudinal axis and can make a seal against a substantially frustoconical surface of [the] said nozzle.

7. Device according to claim 6, wherein [the] said substantially frustoconical portion of [the] said sleeve and [the] said substantially frustoconical surface of [the] said nozzle have substantially identical corresponding taper angles.

[8. Device according to claim 2, wherein the said supporting member is of one niece with the said central body.]

[9. Device according to claim 2, wherein the said diverter unit is substantially plate-shaped with a first shaped surface facing the outlet cross-section of the said nozzle and at a predetermined axial distance in relation to the latter to divert the substantially axial flow of liquid from the said nozzle along a plurality of substantially transverse directions.]

10. Device according to claim [9] *1*, wherein the axial dimensions of [the] said [diverter unit permits the] *deflector member permit* said guide means to be inserted with [the] said [first] shaped surface facing the outlet [cross-section] of [the] said nozzle or in a position which is substantially rotated through 180°.

11. Device according to claim 10, wherein [the] *said shaped surface is a first shaped surface and* said [diverter unit] *deflector member* has a second shaped surface opposite the first and is designed to divert the substantially axial flow of [liquid] *fluid* leaving [the] said nozzle along a plurality of transverse directions with [the] said [diverter unit] *deflector member* inserted in the [said] rotated position.

12. Device according to claim 11, wherein [the] said [diverter unit] *deflector member* comprises a removable insert which can be fitted above the second shaped surface defining a third shaped surface.

13. Device according to claim 12, wherein [the] said [diverter unit] *deflector member* has one or more cavities in an outer edge of [the] said removable insert to make it easier to remove it by inserting the tip of a screwdriver or similar tool.

14. Device according to claim 1, wherein [the] said central body has a threaded portion which is designed to be screwed onto a corresponding thread in [the] said sleeve.

15. Device according to claim 14, wherein [the] said nozzle has one or more radial appendages projecting outwards and slidably insertable into corresponding openings in [the] said central body to prevent rotation of [the] said nozzle with respect to [the] said central body when [they] *said central body and said sleeve* are screwed together.

16. Device according to claim 15, wherein [the] said sleeve has an annular portion to provide radial support for [the] said threaded portion of [the] said central body at [the] *an* inner longitudinal end of [the] said thread.

17. Device according to claim 15, wherein each of [the] said radial appendages has at least one end portion which can be seen from the exterior.

18. Device according to claim 17, wherein [the] said end portion of [the] said radial appendage is substantially flat.

19. Device according to claim 1, wherein [the] said central body comprises an annular bracket directed radially inwards to align [the] said nozzle in relation to [the] said [diverter unit] *deflector member*.

*20. A sprinkler device, particularly for dispersing water and other similar liquids to plants, comprising a central body which is at least partially hollow and defines a longitudinal axis, a connection sleeve for connecting to a feed line, said sleeve being removably linked to said central body, a convergent nozzle for accelerating the liquid interposed between said central body and said sleeve, and a deflector member disposed downstream from said nozzle for diverting a stream of fluid from said nozzle in a substantially transverse direction to disperse the fluid outwards, wherein said deflector member is substantially in the form of a plate having a shaped surface facing an outlet of said nozzle and disposed at a predetermined axial distance therefrom, to divert a substantially axial flow of the fluid issuing from said nozzle along a plurality of substantially transverse directions, further comprising snap connection means between said nozzle and said sleeve, said snap connection means being designed to hold said nozzle in an axially immobilized position with respect to said sleeve when the latter is fitted onto and removed from said central body.*

* * * * *